United States Patent
Ray et al.

(10) Patent No.: US 7,423,665 B2
(45) Date of Patent: Sep. 9, 2008

(54) VEHICLE PATHWAY VISION SYSTEM HAVING IN-PATH DELINEATION RETICLE

(75) Inventors: Michael S. Ray, Carmel, IN (US); Ronald M. Taylor, Greentown, IN (US); Dennis C. Nohns, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 975 days.

(21) Appl. No.: 10/734,317

(22) Filed: Dec. 12, 2003

(65) Prior Publication Data

US 2005/0128289 A1 Jun. 16, 2005

(51) Int. Cl.
*H04N 7/18* (2006.01)
(52) U.S. Cl. .................. 348/118; 348/113; 348/115; 348/116; 348/143; 348/148; 348/158; 359/354; 362/466; 362/465
(58) Field of Classification Search .................. 348/118, 348/113, 116, 115, 143, 148, 153, 158; 359/354; 362/466, 465
See application file for complete search history.

(56) References Cited

U.S. PATENT DOCUMENTS

| 3,434,214 | A | | 3/1969 | Pratt | |
|---|---|---|---|---|---|
| 5,660,454 | A | * | 8/1997 | Mori et al. | 362/466 |
| 5,670,935 | A | * | 9/1997 | Schofield et al. | 340/461 |
| 5,673,143 | A | * | 9/1997 | Chin et al. | 359/354 |
| 6,115,651 | A | | 9/2000 | Cruz | |
| 2002/0128754 | A1 | | 9/2002 | Sakiyama et al. | |

FOREIGN PATENT DOCUMENTS

| DE | 100 37 129 | 4/2001 |
|---|---|---|
| EP | 1 022 903 | 7/2000 |
| EP | 1 065 642 | 1/2001 |
| JP | 07239999 | 9/1995 |

OTHER PUBLICATIONS

European Search Report dated Feb. 16, 2005.

* cited by examiner

*Primary Examiner*—Shawn An
(74) *Attorney, Agent, or Firm*—Jimmy L. Funke

(57) ABSTRACT

A vehicle vision system displays a vehicle pathway image that includes a reticle for visually identifying the in-path portion of the image. A reticle array is disposed between a video camera chip and a lens, and includes a conical or frustro-conical region of substantially un-attenuated light transmissivity surrounded by a region of perceptibly attenuated light transmissivity, such that in-path portions of the displayed image are substantially unchanged and out-of-path portions of the displayed image are perceptibly attenuated. The reticle array may also include a number of reduced transmissivity lines traversing its conical or frustro-conical region to produce a series of receding stadia lines in the in-path portion of the displayed image, enabling the driver to reliably discern the range of displayed objects.

6 Claims, 2 Drawing Sheets

US 7,423,665 B2

VEHICLE PATHWAY VISION SYSTEM HAVING IN-PATH DELINEATION RETICLE

TECHNICAL FIELD

The present invention relates to a pathway vision system for a vehicle, and more particularly to a system that visually distinguishes between in-path and out-of-path regions of a displayed view.

BACKGROUND OF THE INVENTION

Vehicle pathway vision systems use one or more video cameras to display video images in the direction of the forward or reverse pathway of the vehicle to help the driver maneuver the vehicle in a safe manner. The displayed image can be used for vision enhancement during poor lighting conditions, or to present a view that is otherwise restricted or hidden. For example, a reverse pathway image can be displayed as a back-up aid. While it is generally desirable to display a wide field-of-view (FOV) that includes both in-path and out-of-path objects, the driver may have difficulty determining whether a displayed object is in-path or out-of-path, and how far the object is from the vehicle. Accordingly, what is needed is a pathway vision system that enhances the displayed image in a way that enables the driver to easily and reliably discern the position and distance of objects relative to the vehicle and its travel path.

SUMMARY OF THE INVENTION

The present invention is directed to vehicle vision system for displaying an image of a scene in the direction of the vehicle pathway, where the displayed image includes a reticle that visually delineates the in-path portion of the scene. The reticle is preferably formed by a reticle array disposed between a video camera chip and a lens, the array including a conical or frustro-conical region of substantially un-attenuated light transmissivity surrounded by a region of perceptibly attenuated light transmissivity, such that in-path portions of the displayed image are substantially without attenuation and out-of-path portions of the displayed image are perceptibly attenuated. As a result, the driver can easily and reliably distinguish between in-path and out-of-path objects in the displayed scene. The reticle array preferably also includes a number of reduced transmissivity or opaque lines traversing its conical or frustro-conical region to produce a series of receding stadia lines in the in-path portion of the displayed image, enabling the driver to reliably discern the range of displayed objects.

BRIEF DESCRIPTION OF THE DRAWINGS

The present invention will now be described, by way of example, with reference to the accompanying drawings, in which.

DESCRIPTION OF THE PREFERRED EMBODIMENT

The vision system of the present invention is disclosed in the context of a back-up aid for a motor vehicle, where the driver views a video image of a scene along the rearward travel path of the vehicle to determine if the travel path is obstructed. Of course, other applications are also possible, and the system may be part of a more sophisticated control such as a driver warning control or a collision avoidance control.

Figure 1:
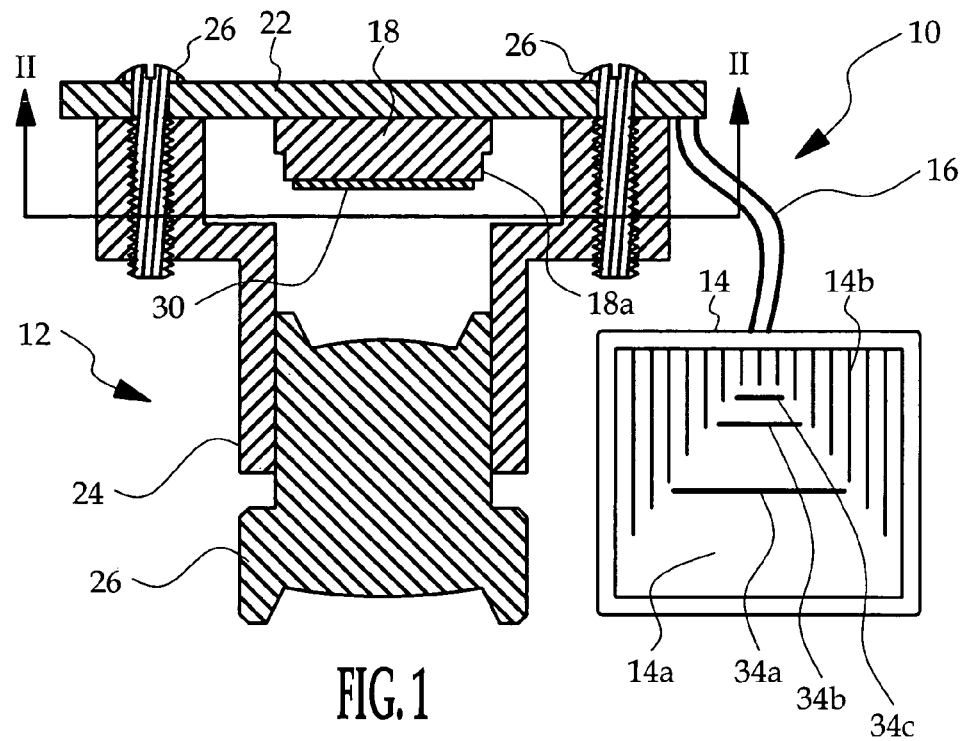
FIG. 1 is a cross-sectional diagram of a vehicle pathway vision system including a camera assembly, a reticle according to this invention and a video display device.
Figure 2:
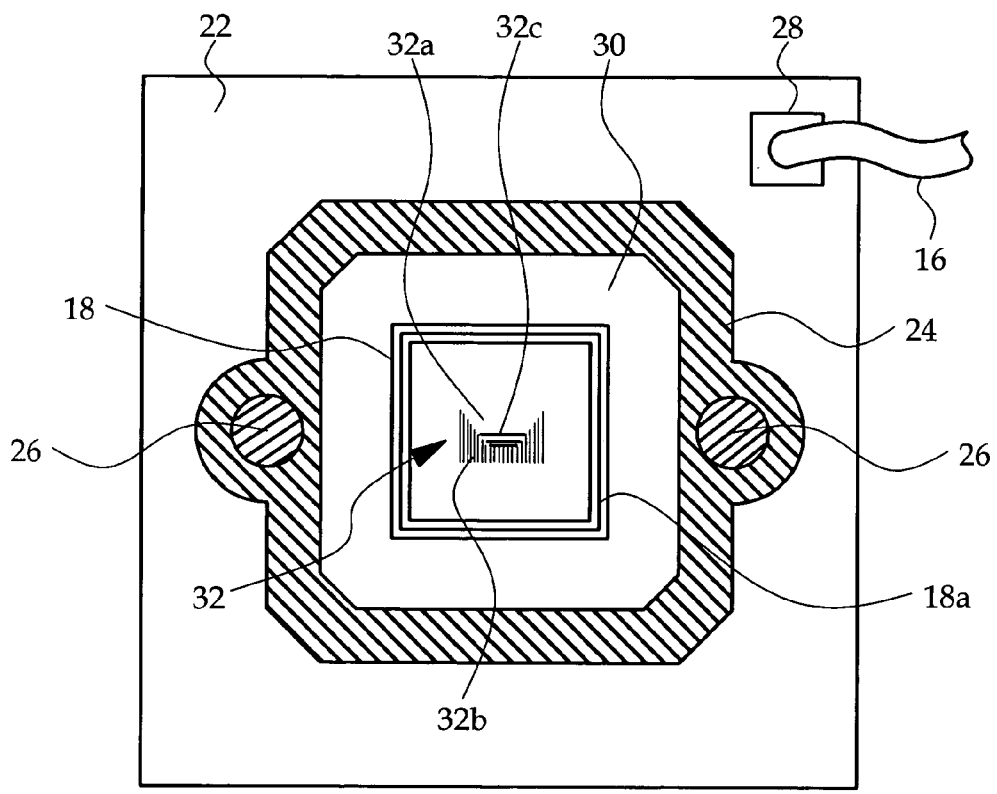
FIG. 2 is a section of the camera assembly and reticle of FIG. 1 taken along lines A-A of FIG. 1.

Referring to FIG. 1, the vision system is generally designated by the reference numeral 10, and fundamentally includes a camera assembly 12 and a display device 14 (such as a conventional flat-panel display) coupled to the camera assembly 12 by a video cable 16. The camera assembly 12 may be mounted, for example, in a central rearward portion of the vehicle, such as in the vicinity of a center-high-mounted-stop-lamp (CHMSL) or the like, whereas the display device 14 will typically be mounted in the vehicle instrument panel or in the vicinity of an interior rear-view mirror.

The camera assembly 12 essentially comprises a video camera chip 18 and an optical lens 20. The camera chip 18 is mounted on a printed circuit board 22, and the lens 20 is fixed in a lens holder 24 that is secured to the circuit board 22 by a set of fasteners 26. The circuit board 22 will typically Support other circuit elements such as a video processing chip, and the video output for display device 14 is coupled to video cable 16 via a suitable circuit board connector 28.

The lens 20 typically comprises a collection of optical elements designed to gather light from a specified field-of-view (FOV) and to focus the light on a focal plane at or near the surface of the camera chip 18. In a vehicle application, a relatively wide field-of-view is usually specified, such as 110° in azimuth and 85° in elevation, so as to present sufficient information to enable the driver to determine if it is safe to proceed. As a result, the displayed image necessarily encompasses both in-path and out-of-path objects, as well as objects at different distances from the rear of the vehicle.

The exposed or outboard surface of camera chip 18 is protected by an integral glass cover 18a, and a reticle substrate 30 is adhered to the glass cover 18a. The reticle substrate 30 is preferably formed of optically transparent glass, processed to define a central reticle array 32 that is aligned with the photo-sensitive cells of camera chip 18. Light impinging on the camera chip 18 first passes through the reticle array 32 so that the features of reticle array 32 appear on display device 14, superimposed on the displayed rearward scene substantially as shown in FIG. 1. In general, the reticle 32 array defines a conical or frustro-conical region 32a of substantially un-attenuated light transmissivity surrounded by a region 32b of perceptibly attenuated light transmissivity. The region 32a represents the portion of the displayed scene through which the vehicle will travel, and thus contains objects that are considered to be in-path. The region 32b includes the remainder of the displayed scene, and thus contains objects that are considered to be out-of-path. Thus, in-path portions of the displayed image are optically un-attenuated, and out-of-path portions of the displayed image, while still visible, are perceptibly attenuated. Viewing the display device 14, the driver can easily and reliably distinguish between in-path and out-of-path objects; those objects within the display region 14a are in-path, and those objects within the display region 14b are out-of-path. If desired, the reticle array 32 may be configured so that the width of the region 14a is somewhat larger than the vehicle width to compensate for slight errors in driver judgment.

The reticle array 32 preferably also includes a number of reduced transmissivity lines 32c traversing its conical or frustro-conical region 32a to produce a series of receding stadia lines 34a, 34b, 34c in the in-path region 14a of the displayed image. The stadia lines 34a, 34b, 34c appear to be located at different distances from the vehicle due to their length and position within the display region 14a, and provide the driver one or more reference marks for determining the distance between the vehicle and objects appearing on display device 14. For example, the stadia lines 34a, 34b, 34c may be placed so they appear to be lying at distances of one, two and three meters from the vehicle. If an object in the vicinity of or within the in-path region 14a appears to be at essentially the same distance away from the vehicle as the stadia line 34b, for example, the driver can conclude that the object is approximately two meters from the rear of the vehicle, and so on. If the width of the in-path region is somewhat wider than the vehicle width as mentioned above, the stadia lines may be somewhat narrower in length as shown in FIG. 1 to represent the vehicle width, if desired.

Figure 3:
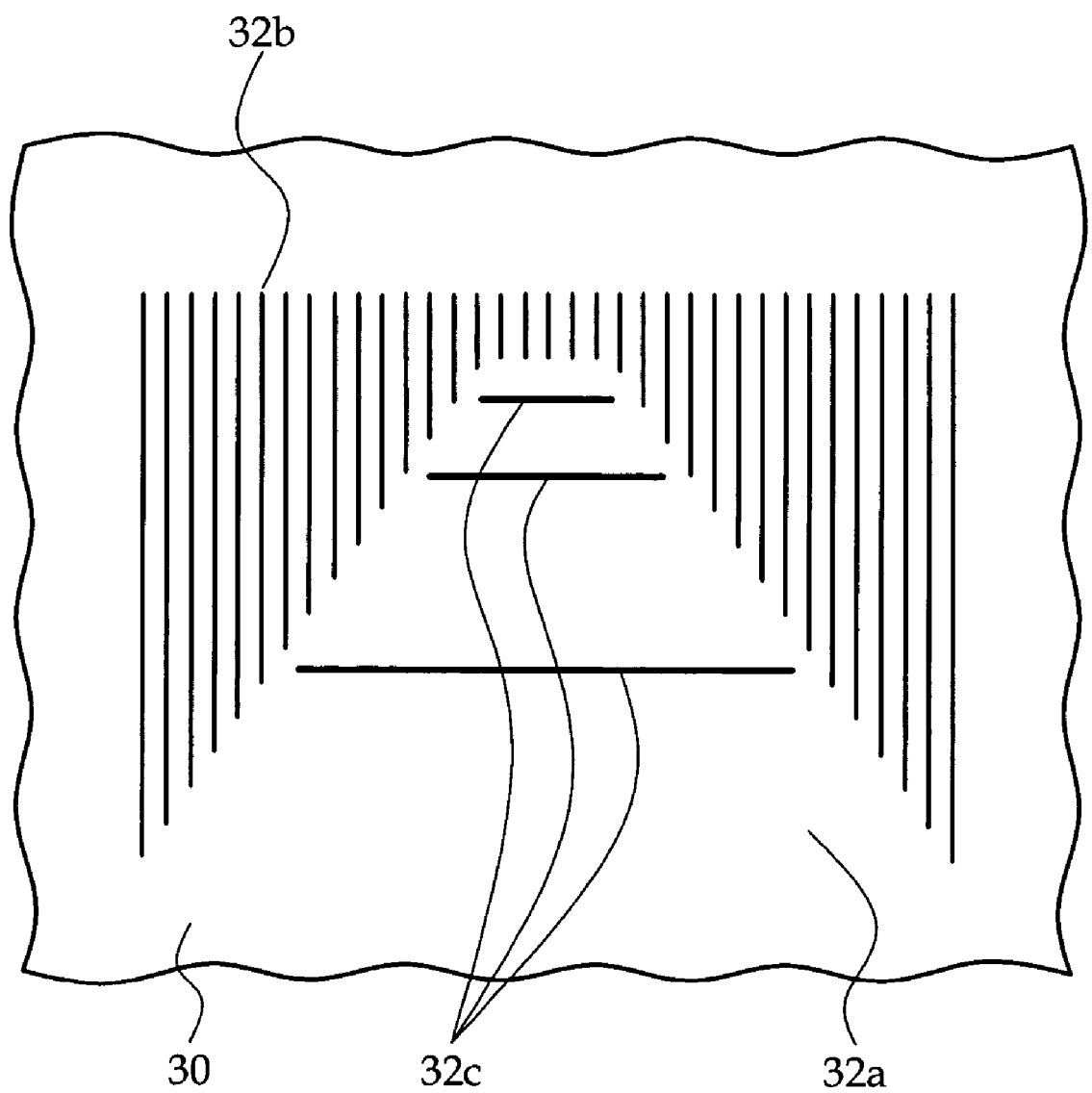
FIG. 3 is a diagram of the reticle of FIG. 1, inverted for illustration convenience.

Referring to FIG. 3 the reticle array 32 is preferably defined by a pattern of lines formed on the substrate 30. The dense pattern of parallel lines in the out-of-path region 32b perceptibly attenuate light transmission, and at the same time define the bounds of the in-path region 32a. The shape of the in-path region 32a may be conical or frustro-conical as shown. The parallel lines in the out-of-path region 32b may be formed by physically marring or etching the substrate 30, or by depositing a thin layer of material on the substrate 30. Deposition materials have absorptive and/or reflective properties that vary with the deposition thickness, and may include aluminium or chromium, for example. The stadia lines 32c, on the other hand, must be individually visible in the displayed image, and are therefore much wider and more opaque than the parallel lines defining the out-of-path region 32b.

While the reticle array 32 is preferably formed on a discrete substrate 30 as described above, it will be recognized that the same or similar effect can be achieved in different ways. For example, the reticle features can be formed directly on the glass cover 18a of camera chip 18, eliminating the separate substrate 30. Alternatively, the reticle features can be produced digitally by the camera chip 18, or a grid overlay may be placed directly on the display device 14. Also, the reticle array 32 can be designed so that the out-of-path display region 14b appears lighter than the in-path region 14a, instead of darker; this can be achieved by side-lighting of the substrate 30, for example. In any case, the reticle of this invention provides the driver a convenient vehicle-based frame of reference for easily and reliably distinguishing between in-path and out-of-path objects in a displayed travel-path image, and for gauging the range of such objects when the reticle includes one or more stadia lines 32c. Various other modifications will also occur to persons skilled in the art. Accordingly, it will be understood that pathway vision systems incorporating these and other modifications may fall within the scope of this invention, which is defined by the appended claims.

The invention claimed is:

1. Apparatus for displaying a video image of a scene in a travel path of a vehicle, comprising:
   a video camera device and lens for imaging a field of view including said travel path, said field of view including out-of-path objects that are out of said travel path as well as in-path objects that are in said travel path;
   a video display device for displaying the imaged field of view;
   a reticle substrate disposed between said video camera device and said lens for visually delineating an in-path portion of said field of view in which said in-path objects are displayed with a first light transmissivity from an out-of-path portion of said field of view in which said out-of-path objects are displayed with a second light transmissivity perceptibly different from the first light transmissivity, wherein said reticle substrate is optically transparent; and
   a reticle array formed on said reticle substrate such that the imaged and displayed field of view includes an image of said reticle array, said reticle being defined by such image of such reticle array, wherein said reticle array includes a conical or frustro-conical region of substantially un-attenuated light transmissivity corresponding to the in-path portion of the displayed field of view, and a region of perceptibly attenuated light transmissivity corresponding to the out-of-path portion of the displayed field of view.

2. The apparatus of claim 1, including a series of successively receding stadia lines in the delineated in-path portion of the displayed field of view corresponding to successively longer ranges from said vehicle.

3. The apparatus of claim 1, wherein:
   said conical or frustro-conical region corresponding to the in-path portion of the displayed field of view includes one or more stadia lines traversing said conical or frustro-conical region for aiding estimation of an object's range from the vehicle.

4. The apparatus of claim 3, wherein said stadia lines have a length that corresponds to a width of the vehicle.

5. The apparatus of claim 4, wherein the delineated in-path portion of the displayed field of view is wider than the length of said stadia lines.

6. The apparatus of claim 1, wherein said reticle substrate is a cover of said video camera device.

* * * * *